(12) United States Patent
Urakawa (10) Patent No.: US 12,399,659 B2
(45) Date of Patent: Aug. 26, 2025

(54) PRINTER

(71) Applicant: BROTHER KOGYO KABUSHIKI KAISHA, Nagoya (JP)

(72) Inventor: Yutaka Urakawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 356 days.

(21) Appl. No.: 18/049,322

(22) Filed: Oct. 25, 2022

(65) Prior Publication Data
US 2023/0129645 A1    Apr. 27, 2023

(30) Foreign Application Priority Data

Oct. 27, 2021 (JP) .................................. 2021-175366

(51) Int. Cl.
*G06F 3/12* (2006.01)
(52) U.S. Cl.
CPC .......... *G06F 3/1204* (2013.01); *G06F 3/1238* (2013.01); *G06F 3/1267* (2013.01)
(58) Field of Classification Search
None
See application file for complete search history.

(56) References Cited

U.S. PATENT DOCUMENTS

| | | | |
|---|---|---|---|
| 2010/0182624 A1 | 7/2010 | Murakami | |
| 2013/0070280 A1* | 3/2013 | Hosoda | G06K 15/1817 358/1.14 |
| 2014/0068715 A1 | 3/2014 | Kondoh | |
| 2017/0177985 A1* | 6/2017 | Hayashi | G06F 3/1267 |
| 2018/0077317 A1 | 3/2018 | Kano | |

FOREIGN PATENT DOCUMENTS

| | | |
|---|---|---|
| JP | H10336375 A | 12/1998 |
| JP | 2008207456 A | 9/2008 |
| JP | 2014052779 A | 3/2014 |
| JP | 2015096295 A | 5/2015 |
| JP | 2016124104 A | 7/2016 |
| JP | 2018039224 A | 3/2018 |
| JP | 2019081289 A | 5/2019 |
| JP | 2019142171 A | 8/2019 |
| JP | 2019142172 A | 8/2019 |

* cited by examiner

*Primary Examiner* — Frantz Bataille
(74) *Attorney, Agent, or Firm* — Scully, Scott, Murphy & Presser, P.C.

(57) ABSTRACT

A printer includes a user interface, a memory, and a controller.
The controller is configured to store, in the memory, storage job data based on a print job received, to display, on the user interface, a list of the storage job data stored, and to accept a first operation and a second operation.
When the controller accepts the first operation, the controller is configured to extract corresponding storage job data from the storage job data and to select a print object from the corresponding storage job data being the storage job data with which first verification information is associated and in which the first verification information corresponds to second verification information input by the first operation.
When the controller accepts the second operation, the controller is configured to selecting, as the print object, the storage job data selected by the second operation.

12 Claims, 10 Drawing Sheets

PRINTER

REFERENCE TO RELATED APPLICATIONS

This application claims priority from Japanese Patent Application No. 2021-175366 filed on Oct. 27, 2021. The entire content of the priority application is incorporated herein by reference.

BACKGROUND ART

In the prior art, a printer having a storage printing function is well-known, in which data based on print data is stored in a memory without immediately starting printing based on a received print job, and the printing based on the data is started by an operation of a user through a user interface. For example, the related art discloses a printer having a storage printing function and a procedure for starting printing based on stored data by using a user interface.

Stored data based on a print job includes data associated with a password. The related art discloses, as procedures for printing from a standby screen, a procedure in which a list of the stored data is displayed, selection of print object data is accepted, and input of a password associated with the selected data is accepted, and a procedure in which input of a password corresponding to a user is accepted, and printing based on data associated with the user among the stored data is started. However, there is room for improvement in a procedure for selecting data as a print object from a plurality of pieces of stored data.

DESCRIPTION

A printer includes a user interface, a communication interface, a memory, and a controller. When the controller receives a print job, the controller is configured to store storage job data in the memory, the storage job data is based on the print job received by the controller. The controller is configured to store, in the memory, the storage job data with which first verification information is associated. The controller is configured to accept a verification information input operation and a print object selection operation via the user interface, the verification information input operation being an operation for inputting second verification information. The first verification information associated with the storage job data is the storage job data corresponding to the second verification information input by the verification information input operation. The controller is configured to extract the storage job data with which the first verification information is associated and to display in a list. The controller is configured to print the storage job data selected, via the user interface, in the stored job data displayed in the list.

A control method and a computer program for implementing the function of the printer described above, and a computer-readable storage medium that stores the computer program are also new and useful.

According to the technique disclosed in the present description, a technique that improves an operability for causing a printer having a storage printing function to start printing based on stored data.

EMBODIMENT

Hereinafter, a printer according to the present embodiment will be described in detail with reference to the drawings. The present embodiment discloses a printer capable of storage printing.

Figure 1:
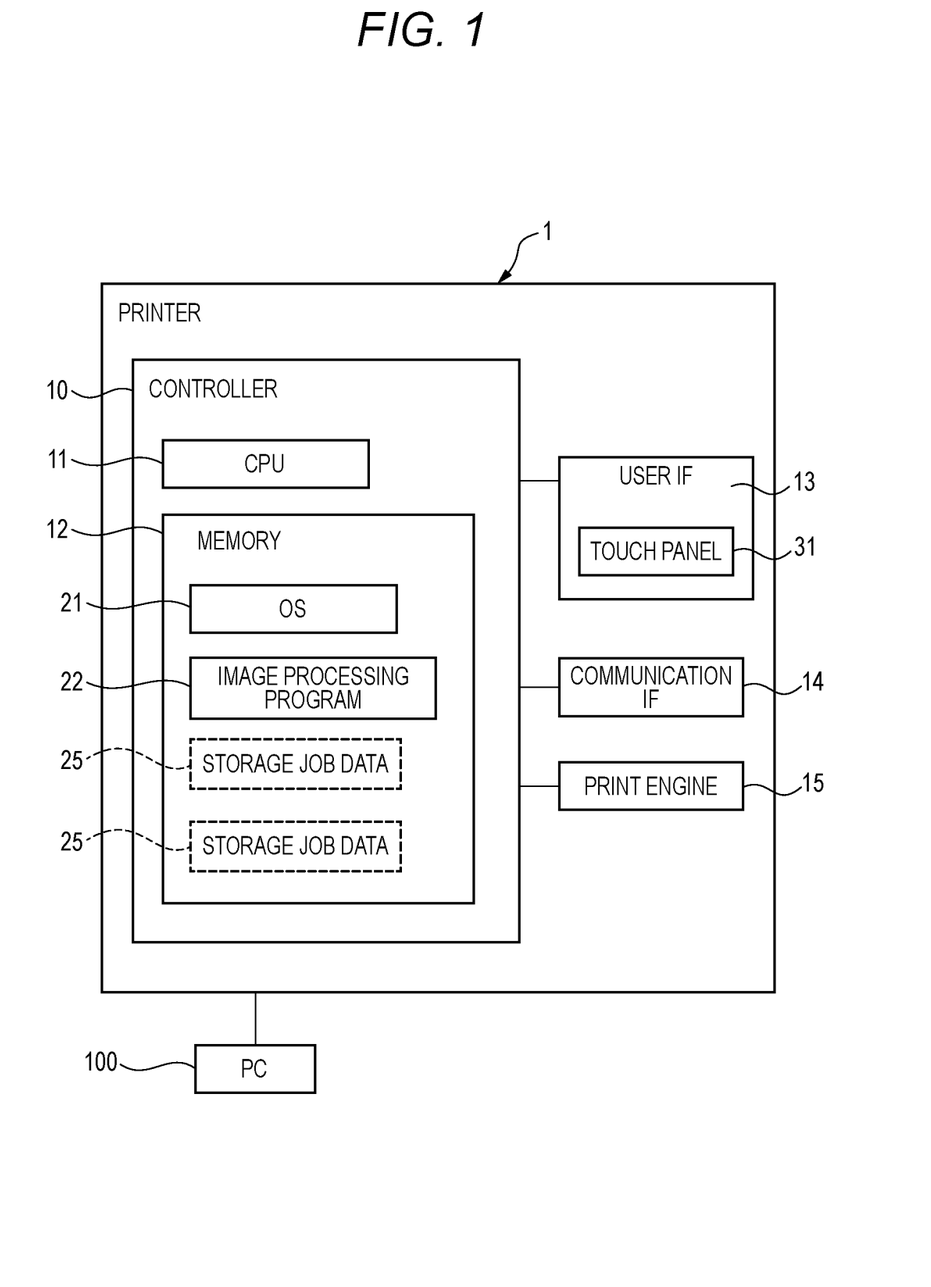
FIG. 1 is a block diagram showing a schematic configuration of a printer of the present embodiment.

As shown in FIG. 1, a printer 1 of the present embodiment includes a controller 10 including a CPU 11 and a memory 12. The printer 1 includes a user interface (hereinafter, referred to as "user IF") 13, a communication interface (hereinafter, referred to as "communication IF") 14, and a print engine 15, which are electrically connected to the controller 10.

The CPU 11 executes various processes in accordance with a program read from the memory 12 and on the basis of an operation of a user. The controller 10 is an example of a controller. The CPU 11 may be an example of a controller. The controller 10 in FIG. 1 is a collective term of hardware and software used for controlling the printer 1, and does not necessarily represent a single piece of hardware actually existing in the printer 1.

The memory 12 of the printer 1 of the present embodiment stores various kinds of data and various programs including an operating system (hereinafter, referred to as "OS") 21 and an image processing program 22. The memory 12 is also used as a work area when the various processes are executed. A buffer included in the CPU 11 is also an example of a memory.

An example of the memory is not limited to ROM, RAM, HDD, and the like built in the printer 1, and may be a storage medium that can be read and written by the CPU 11. For example, an external memory such as a USB memory or an HDD connected to the printer 1 via the communication IF 14, and a memory and an HDD provided in a device connected to the printer 1 via the communication IF 14 are also examples of the memory.

The computer-readable storage medium is a non-transitory medium. In addition to the above examples, the non-transitory medium also includes a storage medium such as a CD-ROM or a DVD-ROM. The non-transitory medium is also a tangible medium. Meanwhile, an electric signal carrying a program downloaded from a server or the like on the Internet is a computer-readable signal medium, which is a kind of a computer-readable medium, but is not included in a non-transitory computer-readable storage medium.

The user IF 13 includes hardware for displaying a screen for notifying the user of information and hardware for accepting the operation of the user. The printer 1 of the present embodiment includes a touch panel 31 having a screen display function and an operation acceptance function as the user IF 13. The user IF 13 may be a combination of the touch panel 31 and an operation button.

The communication IF 14 includes hardware for communicating with an external device such as a personal computer (hereinafter, referred to as "PC") 100. A communication standard of the communication IF 14 is Ethernet (registered trademark), Wi-Fi (registered trademark), USB, and the like. The printer 1 may include a plurality of communication IFs 14 corresponding to a plurality of communication standards.

The print engine 15 includes a configuration for printing an image on a print medium such as a sheet. An image forming method of the print engine 15 is, for example, an electrophotographic method, an inkjet method, or a thermal transfer method.

The printer 1 of the present embodiment is connected to the PC 100, for example, as shown in FIG. 1. The PC 100 includes a printer driver corresponding to the printer 1 and an application program for causing the printer 1 to execute printing by using a function of the printer driver. The PC 100 can generate a print job by using the printer driver and transmit the generated print job to the printer 1.

Next, an operation of the printer 1 will be described with reference to a flowchart and the like. The following processes basically indicate processes of the CPU 11 according to commands described in a program. That is, the processes such as "determination", "extraction", "selection", "calculation", "decision", "specification", "acquisition", "acceptance", and "control" in the following description are the processes of the CPU 11. The processes performed by the CPU also include hardware control using an API of the OS. In the present description, an operation of each program will be described while omitting a description of the OS. That is, in the following description, a description of a purport that "a program B controls hardware C" may refer to "a program B controls hardware C by using the API of the OS". The processes of the CPU 11 according to the commands described in the program may be described in the omitted terms. For example, a description such that "the CPU 11 performs" is present. The processes of the CPU 11 according to the commands described in the program may be described by a term that omits the CPU, such as "a program A performs".

Note that "acquisition" is used as a concept that a request is not required. That is, a process of receiving data without a request of the CPU 11 is also included in the concept of "the CPU acquires the data". The "data" in the present description is represented by a computer-readable bit string. Data having the same substantial meaning and different formats is treated as the same data. The same applies to "information" in the present description. In addition, "request" and "instruct" are concepts indicating that information indicating that a request is being made or information indicating that an instruction is being given is output to a partner. The information indicating that the request is being made or the information indicating that the instruction is being given is simply described as "request" or "instruction".

A process, performed by the CPU 11, of determining whether information A indicates that it is a matter B is conceptually described as "determining whether it is a matter B from information A". A process, performed by the CPU 11, of determining whether information A indicates that it is a matter B or that it is a matter C is conceptually described as "determining whether it is a matter B or a matter C from information A".

When a power of the printer 1 of the present embodiment is turned on, the printer 1 executes a process according to the image processing program 22. The printer 1 goes into a standby state after performing a startup procedure such as an initial setting. A procedure of a standby process in the printer 1 will be described with reference to a flowchart in FIG. 2. The standby process is executed by the CPU 11 according to the image processing program 22 when the printer 1 is in the standby state.

Figure 3:
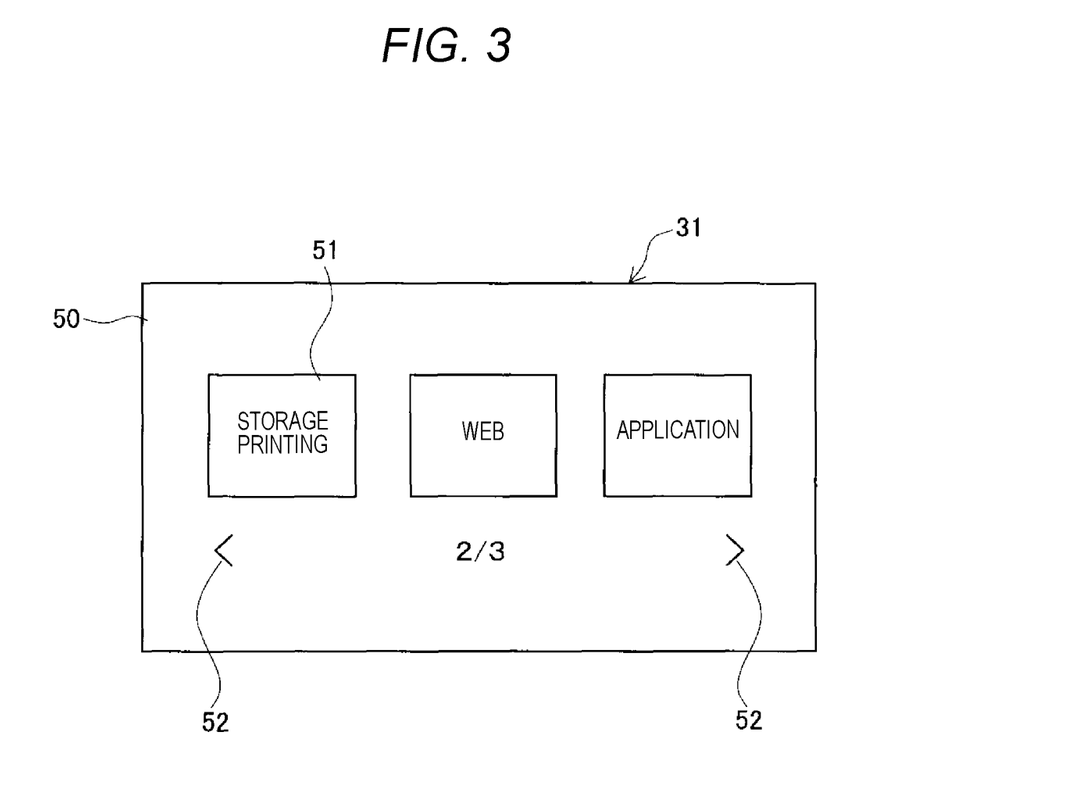
FIG. 3 is an explanatory diagram showing an example of a standby screen.

The CPU 11 causes the user IF 13 to display a standby screen (S101). The standby screen is a screen that can accept instruction input performed by the operation of the user. For example, as shown in FIG. 3, the CPU 11 causes the touch panel 31 to display a standby screen 50 including a plurality of operation areas. The standby screen 50 includes a storage printing button 51 as one of objects that accept the operation of the user.

Figure 2:
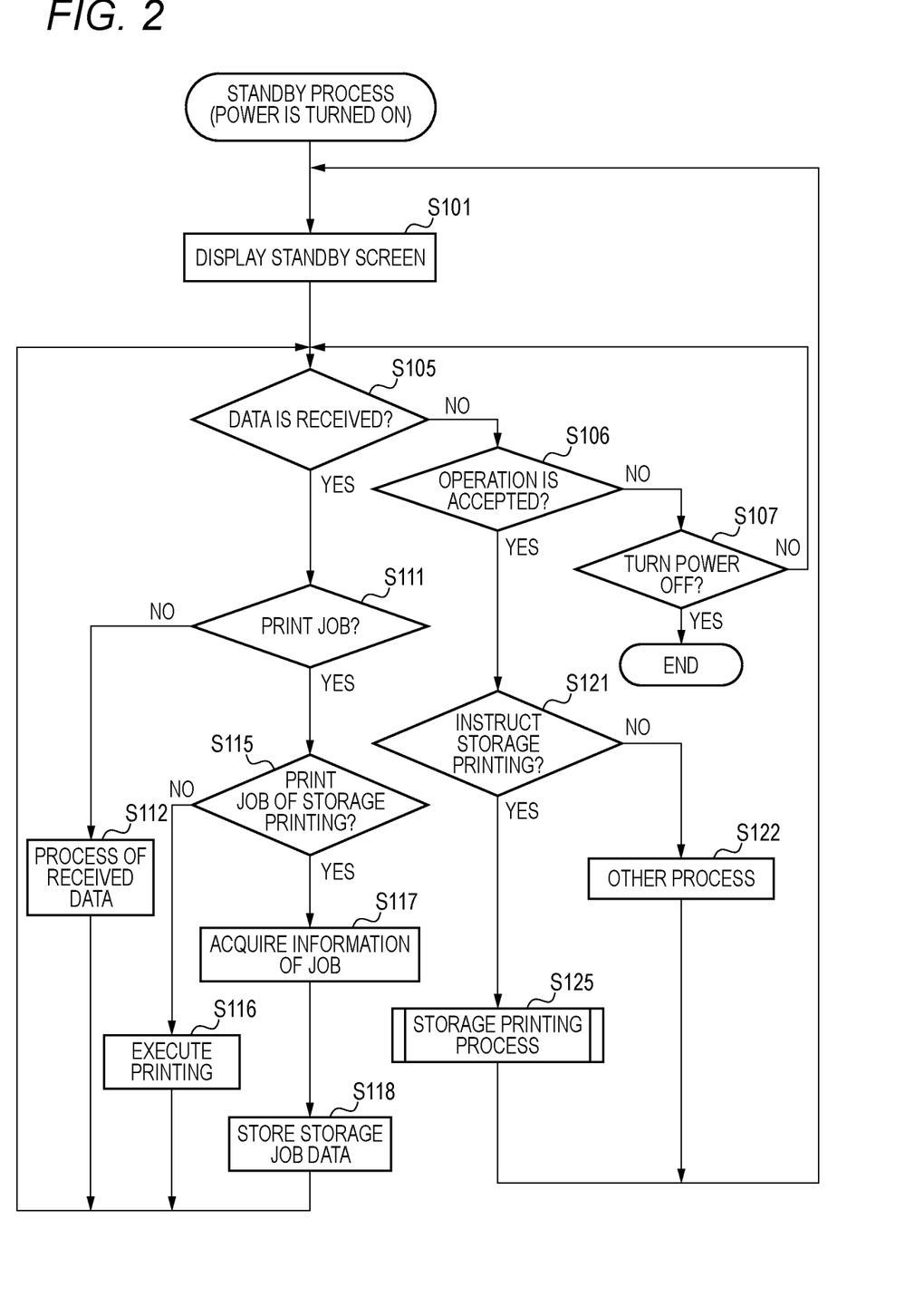
FIG. 2 is a flowchart showing a procedure of a standby process.

The printer 1 can receive various kinds of data such as a print job from the external device such as the PC 100 in the standby state. The CPU 11 determines whether data is received (S105). If it is determined that the data is not received (S105: NO), the CPU 11 determines whether an operation to the standby screen 50 being displayed is accepted (S106). If it is determined that the operation is not accepted (S106: NO), the CPU 11 determines whether an instruction to turn the power off is received (S107). If it is determined that turning power off is not accepted (S107: NO), the CPU 11 repeats the determinations of S105 to S107.

If it is determined that the data is received (S105: YES), the CPU 11 determines whether the received data is data including the print job (S111). If it is determined that the received data is not the data including the print job (S111: NO), the CPU 11 executes a process based on the received data (S112). The printer 1 can receive, for example, an update instruction for firmware or an application program, an update instruction for connection information or setting information, and performs a process on the basis of the received instruction. After S112, the CPU 11 returns to S105 and repeats the determinations of S105 to S107.

If it is determined that the print job is received (S111: YES), the CPU 11 determines whether the received print job is a print job of the storage printing (S115). The storage printing is a printing method in which the received job data is stored in the memory 12 and printing is executed after receiving an operation of the user. That is, the printer 1 does not start printing immediately when receiving the print job of the storage printing, and does not print the print job while the operation of the user is not accepted.

For example, the print job generated by the printer driver of the PC 100 and passed to the printer 1 includes various kinds of incidental information related to printing, and image data indicating an image as a print object. The incidental information is, for example, a job name that identifies a print job, a user name that indicates a user who instructs the printing, information that indicates the storage printing, and print parameters. The user name may be information indicating a user who is logged in to a device that transmits the print job. The user name may be information indicating the user and input via the user IF included in the device that transmits the print job. The image data is, for example, PDL data in a format such as PCLXL or PDF, or raster data such as GDI.

The information indicating the storage printing includes, for example, a password. The password is, for example, a PIN, that is, personal identification number, and is information that is determined in advance by the user instructing the transmission of the print job and is given to the print job. The password may be configured by only numbers or may include letters and symbols. The print job that includes the password as the incidental information is a print job of the storage printing, and the print job that does not include the password is not a print job of the storage printing. Therefore, the password corresponds to the information indicating the storage printing.

If the received print job is the print job that does not include the password, the CPU 11 determines that the print job is not the print job of the storage printing (S115: NO), and executes the printing on the basis of image data of the print job (S116). After S116, the CPU 11 returns to S105 and repeats the determinations of S105 to S107.

If it is determined that the received print job is the print job of the storage printing that includes the password (S115: YES), the CPU 11 acquires the incidental information of the print job (S117). In S117, the CPU 11 acquires at least the password given to the print job. S117 is an example of an acquisition process. The password acquired in S117 is an example of first verification information. If the print job includes the user name, in S117, the CPU 11 also acquires the user name. In this case, S117 is an example of a user acquisition process, and the user name is an example of user information.

The CPU 11 stores storage job data 25 (see FIG. 1) based on the print job in the memory 12 in association with the acquired incidental information (S118). S118 is an example of a storage process. The printer 1 of the present embodiment can store a plurality of pieces of storage job data 25 in the memory 12. After S118, the CPU 11 returns to S105 and repeats the determinations of S105 to S107. In the following, the storage job data may be simply referred to as "job".

When the image data included in the received print job is PDL data, the CPU 11 rasterizes the PDL data to generate raster data, and stores the generated raster data as the storage job data. When the image data included in the received print job is raster data, the CPU 11 stores the raster data as the storage job data. The CPU 11 may store the PDL data as the storage job data without rasterizing the PDL data.

Meanwhile, if it is determined that the operation of the user on the touch panel 31 is accepted while the standby screen 50 shown in FIG. 3 is being displayed (S106: YES), the CPU 11 determines whether the received operation is an operation to the storage printing button 51 (S121). If it is determined that the received operation is not the operation to the storage printing button 51 (S121: NO), the CPU 11 executes a process based on the received operation (S122). After S122, the CPU 11 returns to S101 to display the standby screen, and repeats the determinations of S105 to S107.

For example, when the operation to a scroll icon 52 included in the standby screen 50 is accepted, the CPU 11 causes the user IF 13 to scroll the screen. That is, the CPU 11 can cause the standby screen including a button different from that of the standby screen 50 to be displayed, and can receive an instruction different from that of the standby screen 50 on the displaying standby screen.

If it is determined that the operation to the storage printing button 51 is received (S121: YES), the CPU 11 executes a storage printing process (S125). If the storage job data is not stored in the memory 12 when the operation to the storage printing button 51 is accepted, the CPU 11 ends the storage printing process without executing each step shown in FIG. 4, and returns to the standby process.

A procedure of the storage printing process will be described with reference to a flowchart in FIG. 4. In the storage printing process, the CPU 11 determines whether job extraction according to the user name is set (S201). A printer used by a plurality of users can receive print jobs of the plurality of users, and there is a possibility that storage job data of the plurality of users is stored in the memory 12. The printer 1 stores, in the memory 12, a setting of whether to perform the extraction according to a user name of a selection object job as a procedure for determining the job as a print object. The printer 1 accepts the setting via, for example, the user IF13. The printer 1 may have an embedded web server (EWS) function and may be able to accept the settings via the EWS.

If it is determined that the job extraction according to the user name is set (S201: YES), as shown in FIG. 5, the CPU 11 causes the touch panel 31 to display a user name selection screen 61 (S202) and accepts the selection of the user name (S203). S203 is an example of a user selection process. The user name selection screen 61 is a screen that displays a list 610 of the user names and accepts the selection of one of the user names to be displayed.

For example, the CPU 11 acquires the user name included in the associated incidental information from the storage job data stored in the memory 12, and causes the user name selection screen 61 to display the acquired user name as the list 610. Further, the printer 1 may store information of an operating user name of a user who uses the printer 1 in the memory 12 in advance. When the information of the operating user name is stored, the CPU 11, for example, may cause the user name selection screen 61 to display a list of the operating user names. If only one piece of the storage job data stored in the memory 12 is present, or if all the user names acquired from the storage job data match, the CPU 11 may proceed to S205 without performing S202 and S203.

If the selection of the user name is accepted (S203: YES), among all pieces of the storage job data stored in the memory 12, the CPU 11 extracts the storage job data associated with the selected user name as the selection object job (S204). The storage job data extracted in S204 is an example of selected storage job data. By accepting the selection of the user name and extracting the job in advance, as will be described later, when displaying the list of jobs, the number of jobs to be displayed is reduced, and the user can easily select the job.

Meanwhile, if it is determined that the job extraction according to the user name is not set (S201: NO), the CPU 11 extracts all pieces of the storage job data stored in the memory 12 as the selection object jobs (S205).

After S204 or after S205, the CPU 11 executes a job selection process (S211). The job selection process is a process of accepting the operation of the user for determining the job as the print object from the extracted selection object jobs.

The printer 1 of the present embodiment needs to accept both input of an appropriate password and the job selection before starting the printing based on the storage job data. Therefore, the printer 1 stores job identification information, a password verification result, and a selection state in the memory 12 for each job extracted in S204 or S205 of the storage printing process. Since neither the input of the password nor the job selection is accepted at the start of the job selection process, the printer 1 makes the password verification result unverified and the selection state unselected for all the selection object jobs.

A procedure of the job selection process will be described with reference to a flowchart in FIG. 6. In the job selection process, as shown in FIG. 7, the CPU 11 causes the touch panel 31 to display a job selection screen 62 (S301). S301 is an example of a display process. The job selection screen 62 is a screen that displays a list 620 of the jobs extracted as selection objects and accepts the operation of the user. The list 620 includes job name objects 621 in which the job names of the selection object jobs are displayed. The job name displayed in each job name object 621 is information included in the incidental information of the print job, and is stored in association with the storage job data as the identification information for identifying the storage job data.

The job name of the print job is given to the print job and transmitted by, for example, a user who instructs to transmit the print job. When the received job name of the print job of the storage printing matches the job name of the storage job data already stored in the memory 12, the printer 1 may transmit information requesting change of the job name to a transmission source of the print job, or may give the job name a serial number or the like for identification.

As shown in FIG. 7, in addition to the job name objects 621, the job selection screen 62 includes, for example, a check field 622 indicating a selection state of the job, a select-all button 623, a password input button 624, and a print instruction button 625.

The CPU 11 determines whether a password input instruction performed by an operation to the password input button 624 is accepted (S302). If it is determined that the password input instruction is not accepted (S302: NO), the CPU 11 determines whether a select-all instruction performed by an operation to the select-all button 623 is accepted (S303). If it is determined that the select-all instruction is not accepted (S303: NO), the CPU 11 determines whether an individually-select instruction performed by an operation to the job name object 621 is accepted (S304). If it is determined that the individually-select instruction is not accepted (S304: NO), the CPU 11 determines whether a print instruction performed by an operation to the print instruction button 625 is accepted (S305). If it is determined that the print instruction is not accepted (S305: NO), the CPU 11 waits until any instruction is accepted.

If it is determined that the password input instruction performed by the operation to the password input button 624 is accepted (S302: YES), the CPU 11 executes a password input process (S311).

Figure 8:
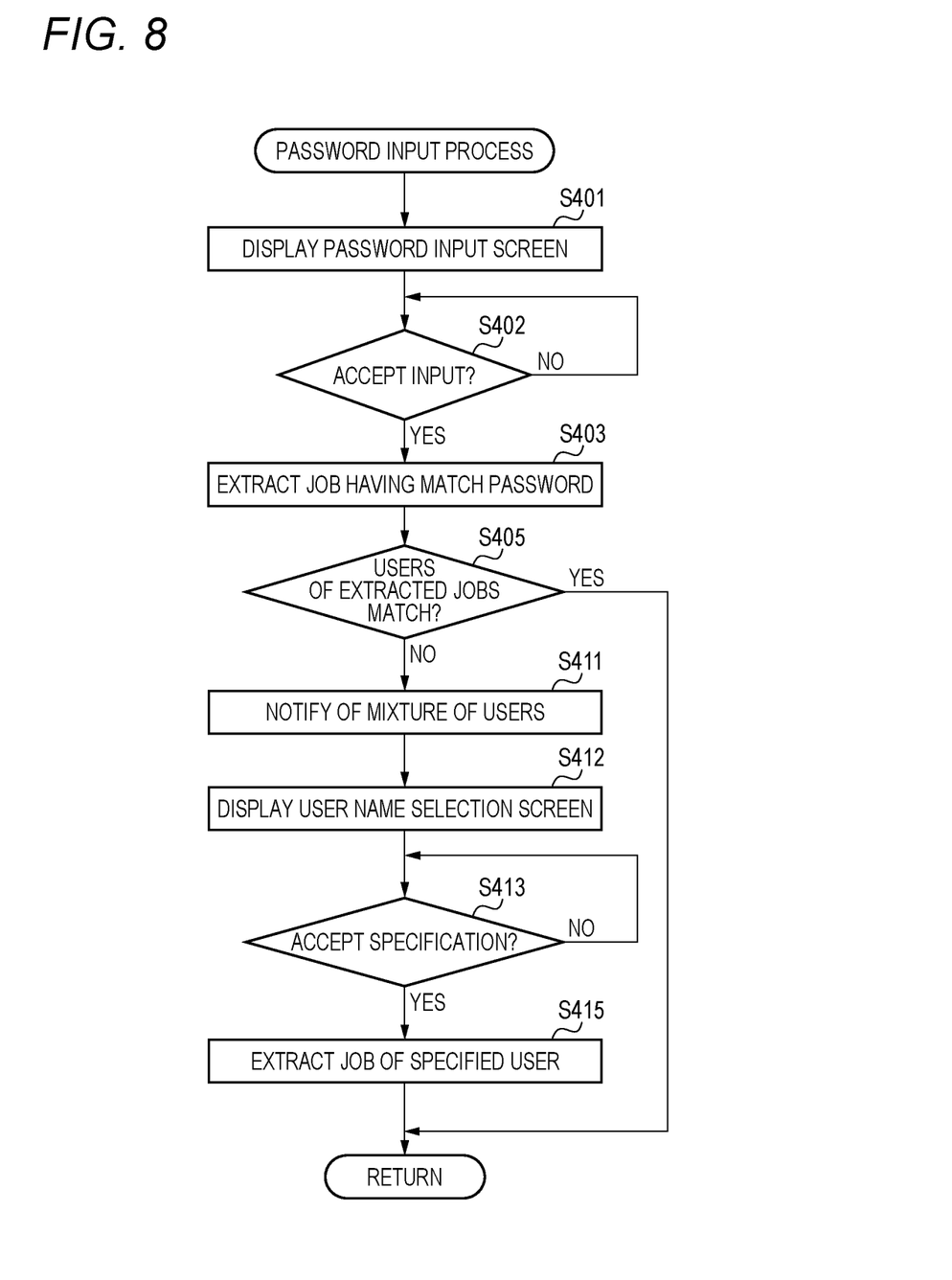
FIG. 8 is a flowchart showing a procedure of a password input process.

A procedure of the password input process will be described with reference to a flowchart in FIG. 8. As shown in an example of FIG. 9, the CPU 11 causes the touch panel 31 to display a password input screen 63 (S401) and accepts the password input (S402). A password input operation accepted by S402 is an example of a first operation or a verification information input operation, and the password accepted by S402 is an example of second verification information.

Figure 9:
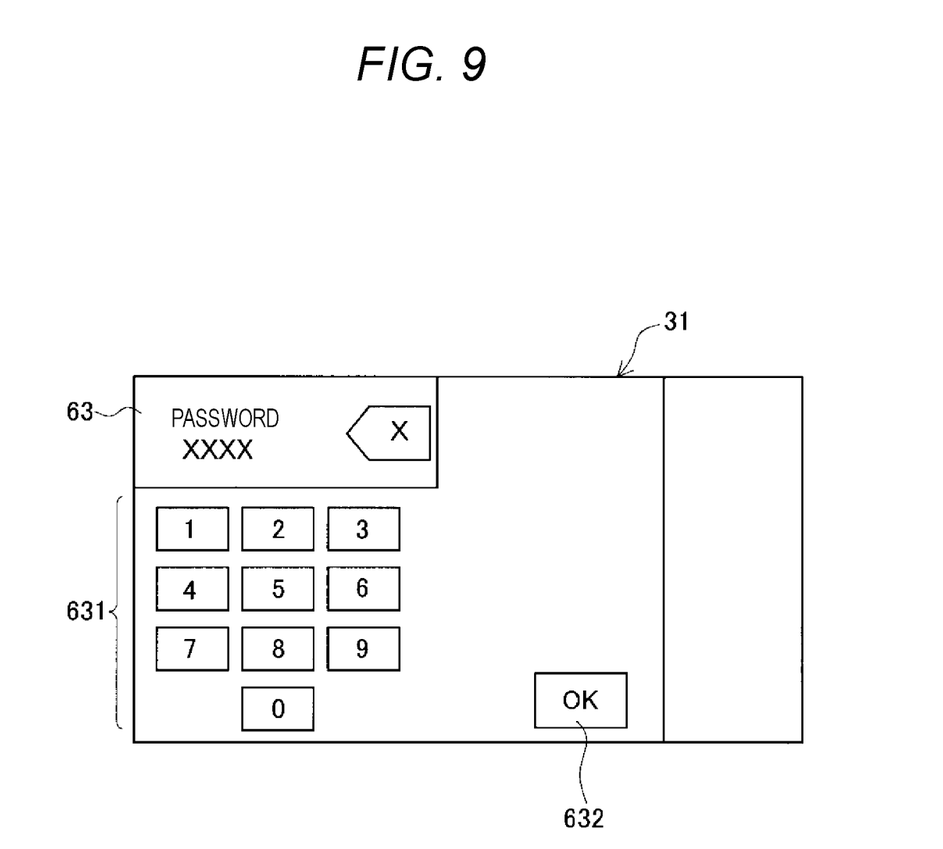
FIG. 9 is an explanatory diagram showing an example of a password input screen.

The password input screen 63 includes number keys 631 and an OK button 632, and is a screen that accepts password input. The user can input a password by using the number keys 631 and confirm the input with the OK button 632. The CPU 11 accepts, as the password, information input when the input to the OK button 632 is accepted. When the CPU 11 accepts an operation to a numeric keypad included in a hard key while the job selection screen 62 is being displayed, the CPU 11 may determine the password input instruction and proceed to S402 of the password input process.

If the password input is accepted (S402: YES), the CPU 11 extracts, among the jobs extracted as the selection objects on the job selection screen 62, the job associated with the password corresponding to the input password (S403). For example, the CPU 11 extracts a job whose password stored in association with the storage job data matches the input password, and changes a password verification result associated with the extracted job to "verification is finished". In S403, the CPU 11 does not change the selection state of each job. S403 is an example of an extraction process. The job extracted in S403 is an example of the corresponding storage job data.

In S403, it is sufficient if the CPU 11 determines the correspondence on the basis of a predetermined rule, which is not limited to exact password match. For example, if a part of the password of the storage job data is matched, the correspondence may be determined.

If it is determined in S403 that the job whose password matches is not present, the CPU 11 may end the job selection process and the storage printing process and return to the standby process. Alternatively, if it is determined that the job whose password matches is not present, the CPU 11 may display a message notifying that the password does not match and accept re-input of the password.

When a plurality of jobs are extracted in S403, the CPU 11 determines whether the user names associated with the storage job data of the extracted jobs match (S405). For example, when print jobs set with the same password are respectively transmitted by a plurality of users, there is a possibility that a plurality of jobs associated with different user names are extracted in S403. If only one job is extracted, the CPU 11 determines YES in S405.

If it is determined that the user names of the extracted jobs match (S405: YES), the CPU 11 ends the password input process and returns to the job selection process. If the job extraction according to the user name is set, and the extraction according to the user name is performed in S201 of the storage printing process, the CPU 11 may skip the determination of S405, end the password input process, and return to the job selection process.

If it is determined that the user names of the extracted jobs do not match (S405: NO), the CPU 11 causes the user IF 13 to notify of mixture of the users (S411) and displays the user name selection screen (S412). For example, the CPU 11 causes the touch panel 31 to display a list of the user names associated with the jobs extracted in S403, similarly to the user name selection screen 61 shown in FIG. 5, and accepts specification of the user (S413). S413 is an example of a specification process. The notification in S411 may be a message included in the screen displayed in S412.

The CPU 11 extracts, among the jobs extracted in S403, the job associated with the user name of the user specified in S413 (S415), ends the password input process, and returns to the job selection process.

Figure 6:
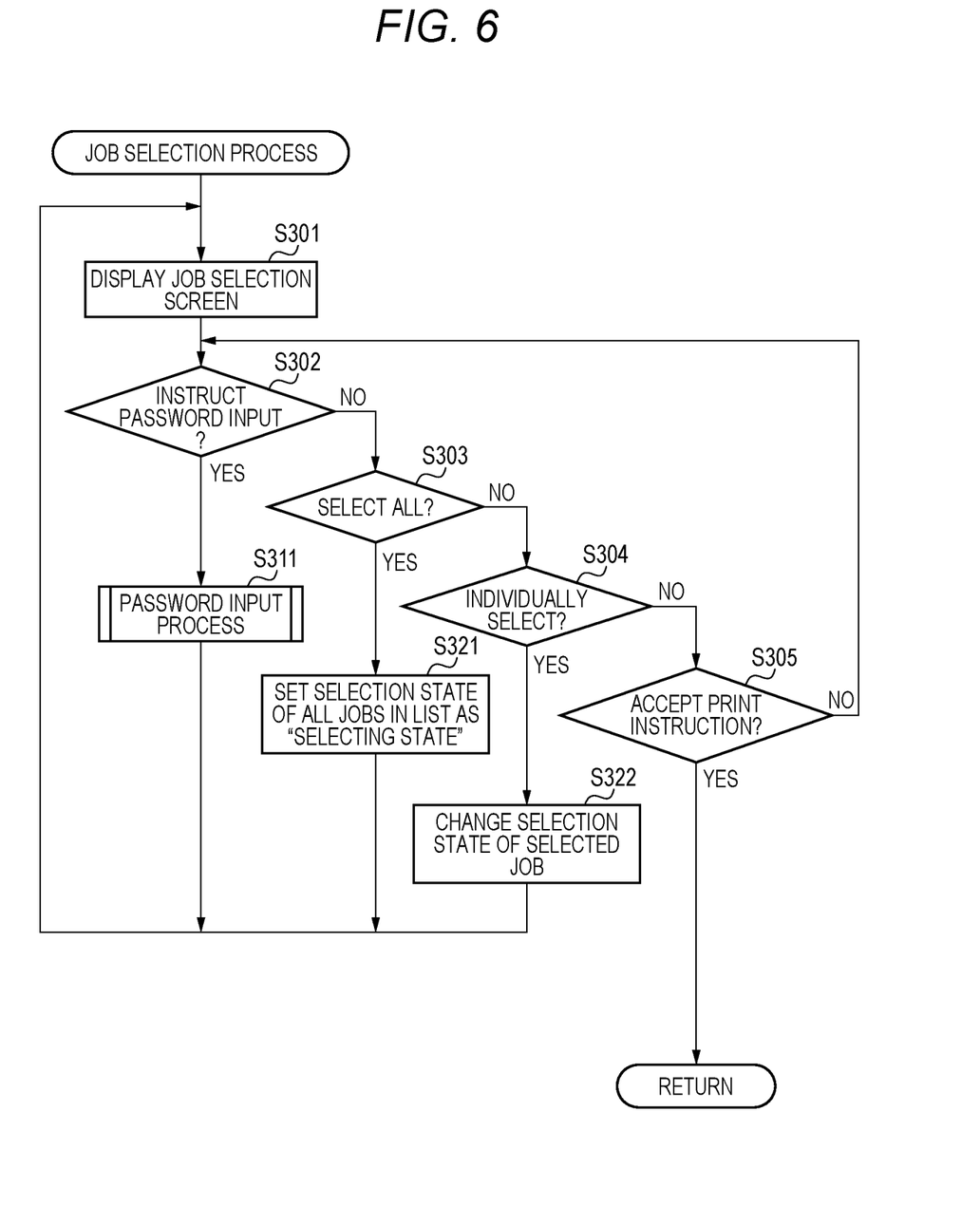
FIG. 6 is a flowchart showing a procedure of a job selection process.
Figure 7:
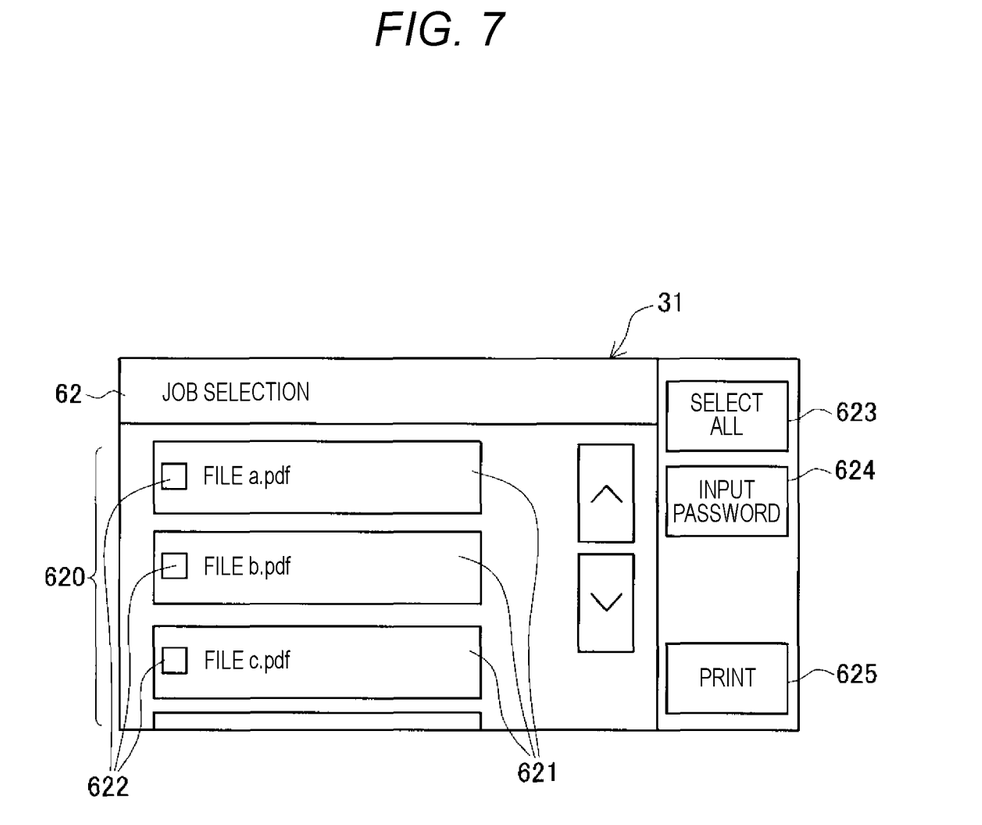
FIG. 7 is an explanatory diagram showing an example of a job selection screen.

Returning to the description of the job selection process in FIG. 6. The CPU 11 returns to S301 after the password input process of S311, and displays the job selection screen 62 including only the jobs extracted in S403 and S415 of the password input process in the list 620. The list of jobs extracted by the password input process is an example of a limited list, and S301 in a case of displaying the jobs extracted by the password input process as the list 620 is an example of a first limited display process. The list of the jobs extracted in S415 after the user specification is received in S413 of the password input process is an example of a user correspondence limited list, and S301 in a case of displaying the jobs extracted in S415 as the list 620 is an example of a second limited display process.

When after receiving the password input to extract the job by the password input process, the password input instruction performed by the operation to the password input button 624 is accepted again on the job selection screen 62 being displayed, the CPU 11 may determine the re-input of the password. In that case, for example, at the start of the job selection process, the CPU 11 may perform the password verification and the job extraction again for all the jobs displayed in the list 620 of the job selection screen 62 as the selection object jobs.

Figure 10:
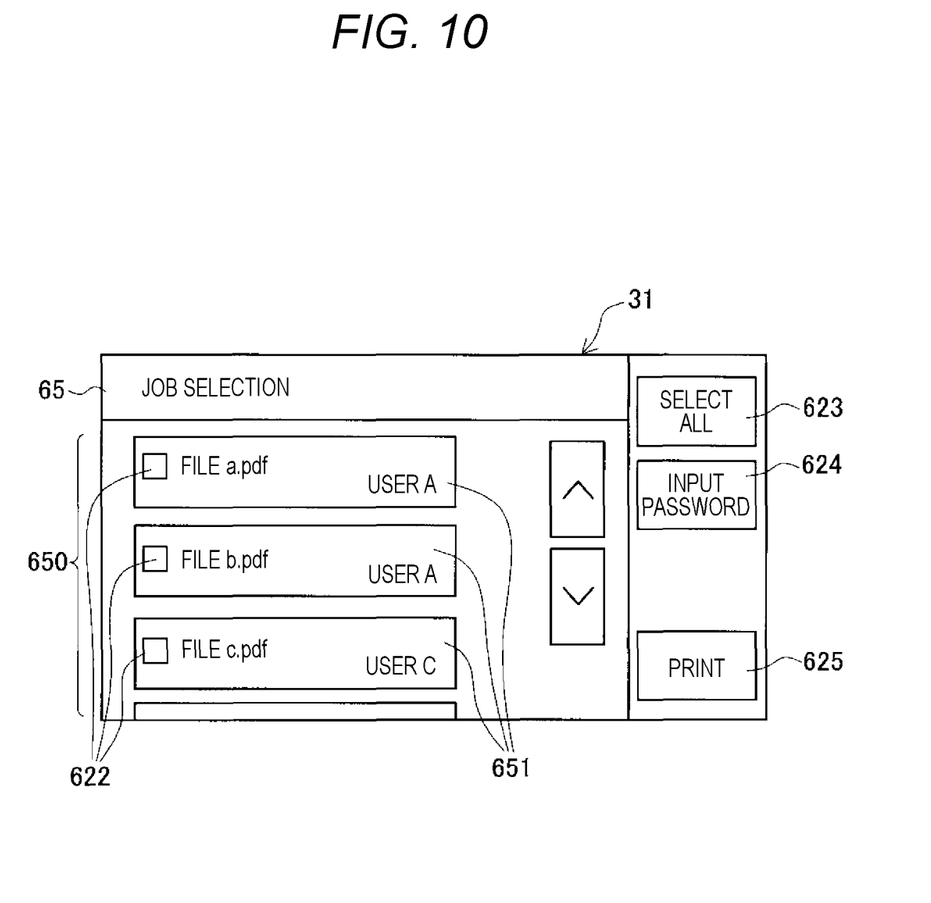
FIG. 10 is an explanatory diagram showing an example of the job selection screen.

If it is determined that the users of the jobs extracted in S403 do not match, the CPU 11 may return to the job selection process without executing S411 to S415, and may cause the touch panel 31 to display a job selection screen 65 as shown in an example of FIG. 10. The job selection screen 65 is a screen that changes the display of the job name objects 621 on the job selection screen 62 to job name objects 651, which are display in which the user name is associated with each job name, and displays a list 650 of the jobs extracted in S403. In this case, the user can determine whether the print job is transmitted by the user himself/herself based on the job name objects 651 displayed on the job selection screen 65.

The process of displaying the job selection screen 65 shown in FIG. 10 is an example of the first limited display process, and the list 650 of the jobs included in the job selection screen 65 is an example of the limited list. The operation of accepting the job selection by the select-all instruction or the individually-select instruction while the job selection screen 65 is displayed is an example of a third operation.

Meanwhile, if it is determined that the select-all instruction is accepted by operating the select-all button 623 included in the job selection screens 62 and 65 (S303: YES), the CPU 11 sets a selection state of all the jobs included in the job selection screens 62 and 65 as "selecting state" (S321). Then, the CPU 11 returns to S301 and displays the job selection screens 62 and 65 with a check mark in the check field 622 of all jobs whose selection states are "selecting states".

For example, when the select-all instruction is accepted without accepting the password input after the job selection process is started, the CPU 11 sets the selection states of all the selection object jobs at the start of the job selection process as the "selecting state". In this case, the operation to the select-all button 623 is an example of a second operation or a print object selection operation, and S321 is an example of a second selection process.

For example, when after starting the job selection process, the password input is accepted in the password input process and the jobs are extracted, and then the select-all instruction is accepted by operating the select-all button 623, the operation to the select-all button 623 is an example of a third operation, and S321 is an example of a first selection process. For example, when after starting the job selection process, the password input and the user specification are accepted in the password input process and the jobs are extracted, and then the select-all instruction is accepted by operating the select-all button 623, the operation to the select-all button 623 is an example of a fourth operation, and S321 is an example of the first selection process.

If it is determined that the individually-select instruction performed by the operation to the job name object 621 included in the job selection screens 62 and 65 is accepted (S304: YES), the CPU 11 changes the selection state of the selected job (S322). Specifically, the CPU 11 changes the selection state of the job to an "unselected state" if the selection state of the job is the "selecting state", and changes the selection state of the job to the "selecting state" if the selection state of the job is the "unselected state". The CPU 11 returns to S301, changes the display of the selection state of the check field 622 of the operated job, and displays the job selection screens 62 and 65.

For example, when the selection state of the job is changed to the "selecting state" by operating the job name object 621 without accepting the password input after the job selection process is started, the operation to the job name object 621 is an example of the second operation, and S322 is an example of the second selection process.

For example, when after the job selection process is started, the job is extracted by accepting the password input in the password input process, and then the selection state of the job is changed to the "selecting state" by operating the job name object 621, the operation to the job name object 621 is an example of the third operation, and S322 is an example of the first selection process. For example, when after the job selection process is started, the job is extracted by accepting the password input and the user specification in the password input process, and then the selection state of the job is changed to the "selecting state" by operating the job name object 621, the operation to the job name object 621 is an example of the fourth operation, and S322 is an example of the first selection process.

If it is determined that the print instruction is accepted by operating the print instruction button 625 included in the job selection screens 62 and 65 (S305: YES), the CPU 11 ends the job selection process and returns to the storage printing process. The CPU 11 determines, as a print object job, the job whose selection state is the "selecting state" when the print instruction is received. The input of the print instruction may be accepted by the operation to a hardware button included in the user IF 13, not limited to the operation to the print instruction button 625.

In the job selection process, the operation to the print instruction button 625 is not accepted when no job is in the "selecting state". When the operation to the print instruction button 625 is accepted when the job in the "selecting state" is not present, the CPU 11 notifies, for example, that the job is not selected. Alternatively, the CPU 11 may not display the print instruction button 625 when the job in the "selecting state" is not present. If the operation to the print instruction button 625 is accepted when the job in the "selecting state" is not present, the CPU 11 may end the job selection process assuming that no job as the print object is present, return to the storage printing process, end the storage printing process, and return to the standby process.

Figure 4:
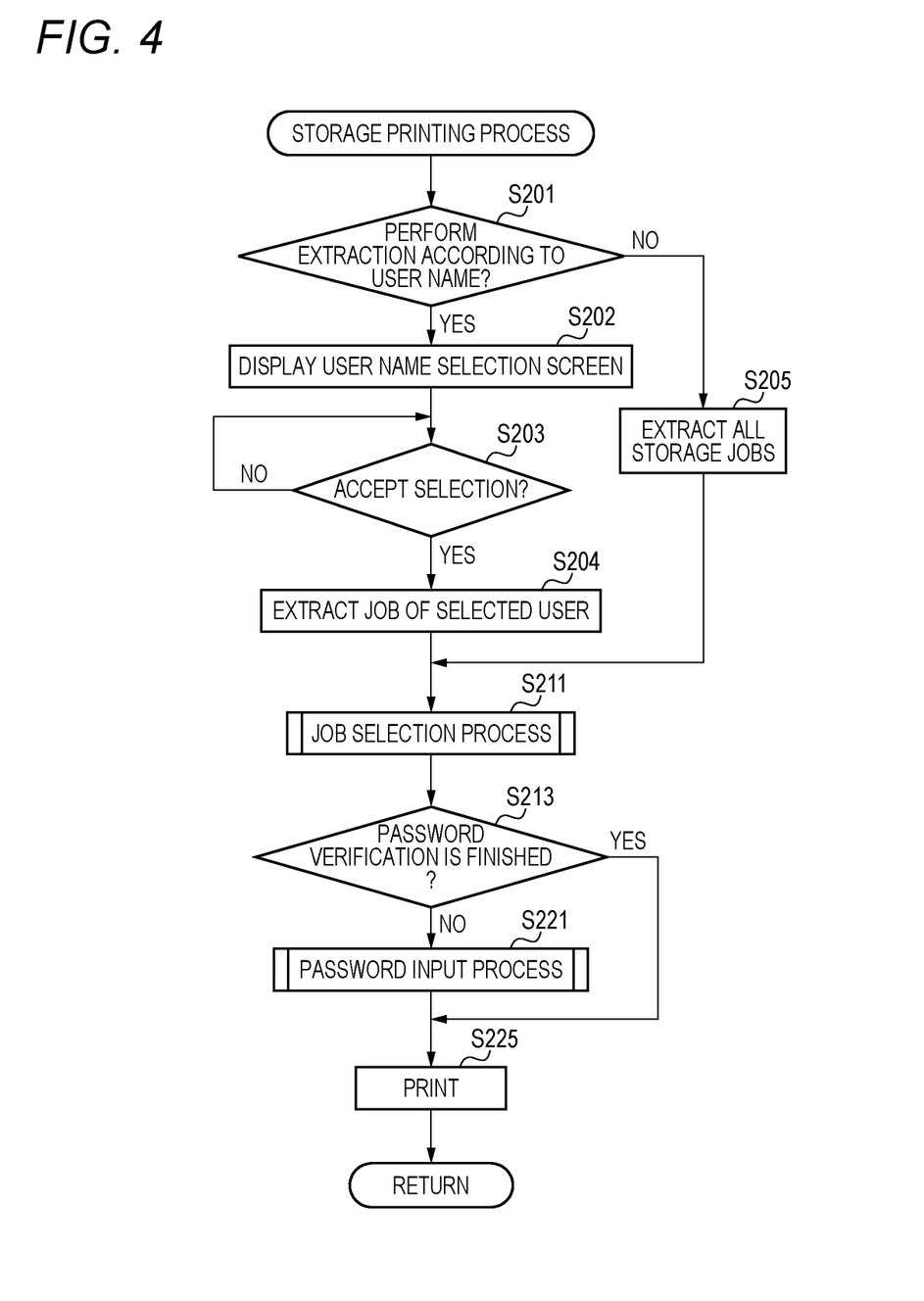
FIG. 4 is a flowchart showing a procedure of a storage printing process.
Figure 5:
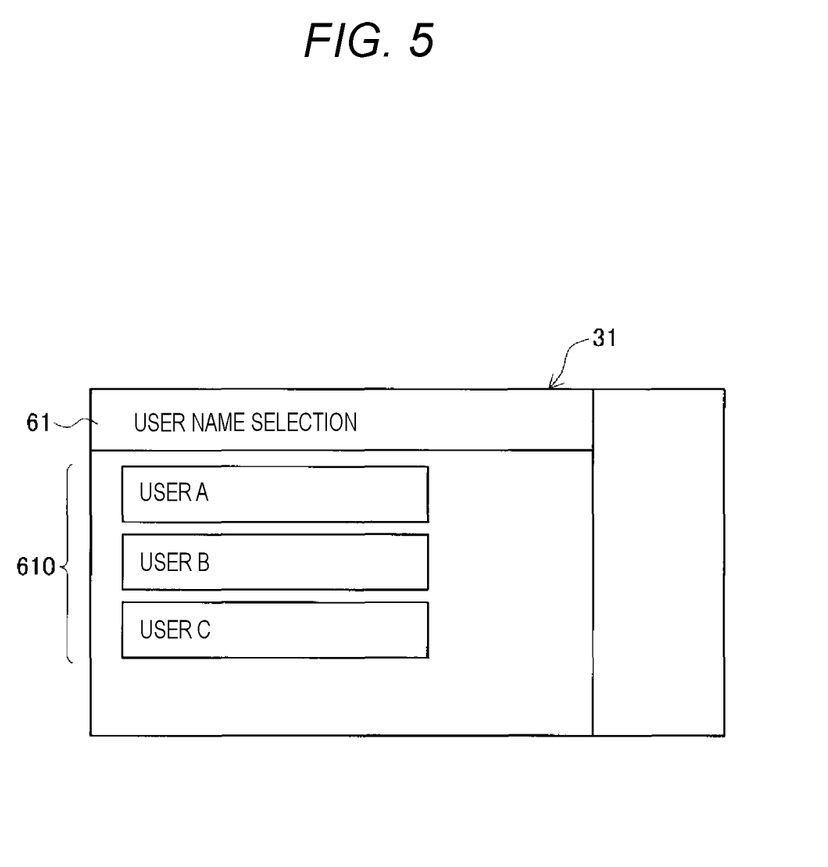
FIG. 5 is an explanatory diagram showing an example of a user name selection screen.

Returning to the description of the storage printing process in FIG. 4. In the storage printing process, the CPU 11 determines whether the password verification result is that "verification is finished" (S213). That is, the CPU 11 determines whether to accept the password input instruction in the job selection process and executes the password input process of S311, that is, whether only the job extracted by the password input process of S311 is the print object.

If it is determined that the password verification result is that "verification is finished" (S213: YES), the CPU 11 executes printing of the job determined to be the print object (S225), ends the storage printing process, and returns to the standby process. S225 in this case is an example of a first printing process. The CPU 11 may delete, from the memory 12, the storage job data whose printing has been completed.

Meanwhile, if it is determined that the password verification result is not the result that "verification is finished" (S213: NO), the CPU 11 executes the password input process shown in FIG. 8 in the same manner as in S311 (S221). When the jobs selected as the print objects in the job selection process include the job associated with the password that does not match the password input in S221 of the password input process, the CPU 11 excludes the job from the print objects. If the job to be excluded is present, the CPU 11 may notify that matter.

After the password input process is completed, the process returns to the storage printing process, and the CPU 11 determines the jobs extracted by the password input process as the print objects, and executes the printing of the jobs determined as the print objects (S225). S225 executed after the password input process is an example of a second printing process. The CPU 11 ends the storage printing process and returns to the standby process.

Returning to the description of the standby process in FIG. 2. After the storage printing process of S125, the CPU 11 returns to S101 to display the standby screen 50 again, and repeats the determinations of S105 to S107. If it is determined that an instruction to turn the power off is accepted (S107: YES), the CPU 11 ends the standby process.

As described in detail above, the printer 1 of the present embodiment displays the list 620 of the storage job data being stored, and can accept the password input operation and a job selection operation while the list 620 is being displayed. While displaying the list 620 of the storage job data, the user can perform the password input operation to extract the jobs and then select the print objects, or can select the job without inputting the password and directly select the job. Therefore, it is easy to select the storage job data as the print object, and an operability for starting the printing based on the storage job data is improved.

Further, in the present embodiment, the received print job includes the password, and the printer 1 extracts the job by verifying the password acquired from the received print job with the password whose input is accepted. That is, when the print job is transmitted, the user can associate the password with each print job and freely categorize the print job to be transmitted. The user can selectively extract the transmitted print job by the password, which is convenient. Further, since the printer 1 of the present embodiment accepts the job selection after extracting the job by the password, the user can decide whether to execute the printing for each job, and a degree of freedom of selection is high as compared with a case where the printing of the extracted job is automatically executed.

In the present embodiment, if the plurality of pieces of storage job data extracted by the password verification are present, and the user names associated with those pieces of the storage job data do not match, since the specification of the user is accepted and the job of the user is extracted, a possibility of executing the job of another user due to an erroneous operation can be reduced. Since the printer 1 can extract the job of the user, and then display only the extracted job, and further accept the job selection, whether to execute the printing for each job can be decided, which is convenient, and the degree of freedom of the selection is high.

In the present embodiment, if the plurality of pieces of storage job data extracted by the password verification are present, and the user names associated with those pieces of the storage job data do not match, since the list can be displayed with the user name, the possibility of executing the job of another user due to an erroneous operation can be reduced.

The present embodiment is merely an example, and does not limit the present invention in any way. Therefore, as a matter of course, the technique disclosed in the present description can be improved and modified in various ways within a range not departing from the gist thereof. For example, the printer 1 is not limited to a printer having a single printing function, and may be any printer having a printing function, such as a multi-function device, a copying machine, or a fax machine. A device for transmitting the print job to the printer 1 is not limited to the PC 100, but may be a smartphone, a tablet computer, or a server computer. A plurality of PCs or the like may be connected to the printer 1.

In the present embodiment, the printer 1 having the touch panel 31 has been described, and it is sufficient if the display of information and acceptance of the instruction input can be appropriately executed, and for example, a combination of an operation button and a display unit other than a touch panel may be provided.

The screens shown in the drawings are examples, and are not limited to the shown examples. For example, the select-all button 623 may be omitted. For example, buttons such as a return button that accepts an instruction to return to a previous procedure, a delete button that accepts an instruction to delete a print job, an unselect-all button that accepts an instruction to unselect all jobs, and a button that accepts an instruction to change a print parameter are further provided. The printer 1 may be provided with a hardware button (not shown), and may be capable of accepting an instruction to cancel the storage printing process by operating the hardware button, for example.

For example, the password may be information that the user who transmits the print job knows, and is not limited to the information determined by the user for each print job. For example, the password may be a password registered for each device that is a transmission source of the print job, or attribute information for extracting the print job. For example, the user name may be used as the password.

For example, the print job does not have to include the user name. In this case, the printer 1 does not extract the job according to the user name. When the print job does not include the user name, the printer 1 may print all jobs that are selected as the print objects and have the matching passwords. The user name is not limited to the information indicating the user, but may be information indicating the device that transmits the print job.

In the present embodiment, an example of the job selection screen 62 in which the job names as information for identifying the jobs are displayed as the list 620 is shown, but the present invention is not limited thereto. For example, the information for identifying the job is not limited to the job name which is the name given by the user, but may be information created by the printer 1. For example, the information may be serial number information created every time a print job is received by the printer 1, or may be information in which information indicating a reception date and time is added to a job name given by the user. However, displaying the job name which is the name given by the user on the job selection screen is made clear to the user.

In the present embodiment, the selection state of the job is not changed only by extracting the job by the input password, but the present invention is not limited thereto. For example, when the job is extracted by the password input process of the job selection process, the selection state of the extracted job may be automatically changed to the "selecting state". When the password input instruction is accepted after accepting the job selection by the select-all instruction or the individually-select instruction, the CPU 11 may extract a job from jobs whose selection states are the "selecting state".

For example, in the present embodiment, it is determined in the password input process whether the users of the jobs whose passwords match are matched, and a timing for determining the matching of the users is not limited thereto.

For example, even when the plurality of jobs are selected by the select-all instruction or the individually-select instruction, the matching of the users of the selected jobs may be confirmed. Specifically, when the selection states of the plurality of jobs are the "selecting state" by S321 or S322 of the job selection process, the CPU 11 may determine whether the users of the jobs in the "selecting state" match. For example, in the job selection process, even if the password is accepted, the matching of the users is not determined, and when it is determined in S213 of the storage printing process that the password verification is finished, the matching of the users may be determined.

In the present embodiment, the print job that does not include the password is not stored, but the print job that does not include the password may also be stored. In that case, in S403 of the password input process executed in S311 of the job selection process and S221 of the storage printing process, the CPU 11 may extract both the job with the matching password and the job with no associated password. If the password is not associated with any of the jobs as the extracted objects in the password input process, the CPU 11 may extract all the jobs as the extracted objects without displaying the password input screen or accepting the password input.

In any flowchart disclosed in the embodiment, any of a plurality of processes in a plurality of steps can be freely changed in an execution order or executed in parallel as long as no contradiction occurs in process contents.

The processes disclosed in the embodiment may be executed by hardware such as a single CPU, a plurality of CPUs, or an ASIC, or a combination thereof. In addition, the processes disclosed in the embodiment can be implemented in various aspects such as a storage medium in which a program for executing the processes is stored, a method, or the like.

What is claimed is:

1. A printer, comprising:
a user interface;
a communication interface;
a memory; and
a controller, wherein
when the controller receives a print job via the communication interface, the controller is configured to execute a storage process of storing storage job data in the memory,
the storage job data is based on the print job received by the controller,
the memory is configured to be stored a plurality of pieces of the storage job data, the controller is configured to store, in the memory, the storage job data with which first verification information and user information are associated in the storage process,
the controller is configured to execute a display process of displaying, on the user interface, a list of the storage job data stored in the memory by the storage process,
the controller is configured to accept a first operation and a second operation via the user interface in a state where the list is displayed by the display process,
the first operation is an operation for inputting second verification information,
the second operation is an operation for selecting at least one piece from the storage job data stored in the memory by the storage process,
when the controller accepts the first operation prior to accepting a selection of an item on the list, the controller is configured to execute an extraction process, a second display process and a first selection process, the extraction process is process of extracting corresponding storage job data to be displayed in an extracted list from the storage job data stored in the memory by the storage process without extracting non-corresponding storage job data, the corresponding storage job data is the storage job data in which the first verification information associated with the storage job data corresponds to the second verification information input by the first operation, the non-corresponding storage job data is the storage job data in which the first verification information associated with the storage job does not correspond to the second verification information input by the first operation;
the second display process is a process of displaying the extracted list of the corresponding storage job data,
the first selection process is process of selecting a print object from the extracted list displayed in the second display process, and
when the controller accepts the second operation in the state where the list is displayed by the display process and the second operation is accepted before the first operation is accepted, the controller is configured to execute a second selection process of selecting, as the print object, the storage job data selected by the second operation from the storage job data stored in the memory by the storage process.

2. The printer according to claim 1, wherein
when the controller receives the print job is received via the communication interface, the controller is configured to execute an acquisition process of acquiring the first verification information from the print job received by the controller,
in the storage process, when the first verification information is acquired in the acquisition process, the controller is configured to store the storage job data in the memory, and
the storage job data is based on the print job received by the controller in association with the first verification information acquired.

3. The printer according to claim 1, wherein
when the controller receives the print job via the communication interface, the controller is configured to execute a user acquisition process of acquiring the user information from the print job received by the controller,
in the storage process, when the controller acquires the user information in the user acquisition process, the controller is configured to store the storage job data in the memory,
the storage job data is based on the print job received by the controller in association with the first verification information and the user information acquired in the user acquisition process,
the controller is configured to execute a user selection process of accepting a selection of a user via the user interface, and
in the display process, when the user is selected by the user selection process, the controller displays, on the user interface, a list of selected storage job data from the storage job data stored in the memory by the storage process,
the selected storage job data is the storage job data with which the user information is associated,
the selected storage job data is the storage job data in which the user information associated with the storage job data corresponds to the user selected by the user selection process, and in the display process, when the user is not selected by the user selection process, the controller displays, on the user interface, the list of all pieces of the storage job data stored in the memory by the storage process is displayed.

4. The printer according to claim 1, wherein
the controller is configured to accept a third operation via the user interface in a state where the extracted list is displayed, the third operation being an operation for selecting at least one corresponding storage job from the extracted list and
the controller is configured to select, as the print object, the corresponding storage job data selected by the third operation in the first selection process.

5. The printer according to claim 1, wherein
when the controller receives the print job via the communication interface, the controller is configured to execute a user acquisition process of acquiring the user information from the print job received by the controller,
in the storage process, when the user information is acquired in the user acquisition process, the controller is configured to store the storage job data in the memory,
the storage job data is based on the print job received by controller in association with the first verification information and the user information acquired in the user acquisition process,
when the user information associated with each piece of the corresponding storage job data does not match, the controller is configured to execute a specification process of specifying a user from users shown in the user information associated with each corresponding storage job data based on an input accepted via the user interface,
the corresponding storage job data extracted by the extraction process includes a plurality of pieces of the corresponding storage job data with which the user information is associated, and
in the first selection process, when the controller executes the specification process, the controller is configured to select, as the print object, the corresponding storage job data with which the user information is associated corresponding to the user specified by the specification process.

6. The printer according to claim 5, wherein
in the first selection process, when the controller executes the specification process, the controller is configured to execute a third display process of displaying, on the user interface, a user correspondence limited list which is a list of the corresponding storage job data with which the user information is associated corresponding to the user specified by the specification process,
the controller is configured to accept a third operation via the user interface in a state where the user correspondence limited list is displayed,
the third operation is an operation for selecting at least one piece from the corresponding storage job data displayed in the user correspondence limited list, and
the controller is configured to select, as the print object, the corresponding storage job data selected by the third operation in the first selection process.

7. The printer according to claim 1, wherein
when the controller receives the print job via the communication interface, the controller is configured to execute a user acquisition process of acquiring the user information from the print job received by the controller,
in the storage process, when the user information is acquired in the user acquisition process, the controller is configured to store the storage job data based on the print job received by controller in the memory in association with the first verification information and the user information acquired in the user acquisition process, and
the controller is configured to accept a third operation via the user interface in a state where the extracted list is displayed,
the third operation is an operation for selecting at least one piece from the corresponding storage job data displayed in the extracted list,
the controller is configured to display the corresponding storage job data with which the user information is associated corresponding the user information associated with the corresponding storage job data in the extracted list, and
the controller is configured to select, as the print object, the storage job data selected by the third operation in the first selection process.

8. The printer according to claim 1, wherein
when a print instruction is accepted via the user interface, the controller is configured to execute a first printing process of starting of printing based on the corresponding storage job data selected from the extracted list in the first selection process,
when the print instruction is accepted via the user interface without accepting the first operation, in a state where the storage job data is selected by the second selection process, the controller is configured to accept input of the second verification information via the user interface and to execute a second printing process, and
the second printing process is process of starting of printing based on the storage job data in which the first verification information associated with the storage job data corresponds to the second verification information input by the print instruction.

9. A printer, comprising:
a user interface;
a communication interface;
a memory; and
a controller, wherein
when the controller receives a print job via the communication interface, the controller is configured to execute a storage process of storing storage job data in the memory,
the storage job data is based on the print job received by the controller,
the memory is configured to be stored a plurality of pieces of the storage job data,
the controller is configured to store, in the memory, the storage job data with which first verification information and user information are associated in the storage process,
the controller is configured to accept a verification information input operation and a print object selection operation via the user interface,
the verification information input operation is an operation for inputting second verification information,
the print object selection operation is an operation for selecting at least one piece among the storage job data stored in the memory by the storage process, when the controller accepts the verification information input operation prior to receiving the print object selection operation, the controller is configured to execute an extraction process and a first limited display process, the extraction process is process of extracting corresponding storage job data to be displayed as a limited list from the storage job data stored in the memory by the storage process without extracting non-correspond storage job data, the corresponding storage job data is the storage job data with which, the first verification information associated with the storage job data corresponds to the second verification information input by the verification information input operation, the non-corresponding storage job data is storage job date where the first verification information associated with the storage job data does not correspond to the second verification information in by the verification information input operation, the first limited display process is process of displaying the limited list on the user interface, the limited list is a list of the corresponding storage job data extracted by the extraction process, the controller is configured to accept the print object selection operation via the user interface in a state where the limited list is displayed by the first limited display process, the print object selection operation is an operation for selecting at least one piece from the corresponding storage job data displayed in the limited list by the first limited display process, when the controller accepts the print object selection operation, the controller is configured to execute a second selection process and to print the storage job data selected by the second selection process, the second selection process is process of selecting, as a print job data, the storage job data selected by the print object selection operation from the storage job data stored in the memory by the storage process, the print job data is job data to be printed.

10. The printer according to claim 9, wherein when the controller receives the print job via the communication interface, the controller is configured to execute an acquisition process of acquiring the first verification information from the print job received by the controller, in the storage process, when the first verification information is acquired in the acquisition process, the controller is configured to store the storage job data in the memory, and the storage job data is based on the print job received by the controller in association with the first verification information acquired.

11. The printer according to claim 9, wherein when the controller receives the print job via the communication interface, the controller is configured to execute a user acquisition process of acquiring the user information from the print job received by the controller, in the storage process, when the controller acquires the user information in the user acquisition process, the controller is configured to store the storage job data in the memory, the storage job data is based on the print job received by controller in association with the first verification information and the user information acquired in the user acquisition process, the controller is configured to execute a user selection process of accepting a selection of a user via the user interface, and when the user is selected by the user selection process, the controller is configured to execute the extraction process of extracting the corresponding storage job among the storage job data stored in the memory by the storage process.

12. The printer according to claim 9, wherein when the controller receives the print job via the communication interface, the controller is configured to execute a user acquisition process of acquiring the user information from the print job received by the controller, in the storage process, when the user information is acquired in the user acquisition process, the controller is configured to store the storage job data in the memory, the storage job data is based on the print job received by the controller in association with the first verification information and the user information acquired in the user acquisition process, when the user information associated with each piece of the corresponding storage job data does not match, the controller is configured to execute a specification process of specifying a user from users shown in the user information associated with each corresponding storage job data based on an input accepted via the user interface, the corresponding storage job data extracted by the extraction process includes a plurality of pieces of the corresponding storage job data with which the user information is associated, and when the controller executes the specification process, the controller configured to execute the extraction process of extracting the corresponding storage job data associated with the user information corresponding to the user specified by the specification process.

* * * * *